US012677734B2

(12) United States Patent
Iida

(10) Patent No.: US 12,677,734 B2
(45) Date of Patent: Jul. 14, 2026

(54) WORK VEHICLE

(71) Applicant: Yanmar Holdings Co., Ltd., Osaka (JP)

(72) Inventor: Tetsuya Iida, Okayama (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 519 days.

(21) Appl. No.: 18/197,494

(22) Filed: May 15, 2023

(65) Prior Publication Data

US 2023/0371423 A1     Nov. 23, 2023

(30) Foreign Application Priority Data

May 17, 2022     (JP) .................................. 2022-080559

(51) Int. Cl.
*A01D 34/00*          (2006.01)
*A01D 34/64*          (2006.01)

(52) U.S. Cl.
CPC ........... *A01D 34/006* (2013.01); *A01D 34/64* (2013.01)

(58) Field of Classification Search
CPC ........ F16H 59/54; F16H 61/47; F16H 61/437; B60T 7/04
See application file for complete search history.

(56) References Cited

U.S. PATENT DOCUMENTS

| | | | | |
|---|---|---|---|---|
| 6,164,396 A | * | 12/2000 | Matsufuji | ............. B60W 10/10 180/6.34 |
| 7,913,799 B2 | * | 3/2011 | Kawashiri | ........... B60W 10/103 180/335 |
| 2011/0203868 A1 | | 8/2011 | Toyokawa et al. | |
| 2016/0039283 A1 | | 2/2016 | Tomioka | |

FOREIGN PATENT DOCUMENTS

| | | |
|---|---|---|
| JP | 2015101163 A | 6/2015 |
| JP | 2017-178044 A | 10/2017 |

OTHER PUBLICATIONS

European Search Report dated Oct. 5, 2023 issued for EP Application No. 23171864.4.

* cited by examiner

*Primary Examiner* — Huan Le
(74) *Attorney, Agent, or Firm* — NORTON ROSE FULBRIGHT US LLP

(57)          ABSTRACT

A tractor includes rear wheels, a transmission, brake pedals (a left brake pedal and a right brake pedal), a brake device, a cruise control operating tool, and a cruise control device. The pair of rear wheels is provided on right and left. The transmission shifts the gear for the vehicle speed. The pair of brake pedals is provided on right and left. The brake device individually actuates brakes for the rear wheels on right and left when the brake pedal is operated. The cruise control device fixes the gear of the transmission when the cruise control operating tool is operated, cancels the fixed gear of the transmission when the left brake pedal is operated, and cancels the fixed gear of the transmission when the right brake pedal is operated.

11 Claims, 11 Drawing Sheets

WORK VEHICLE

CROSS-REFERENCE TO RELATED APPLICATIONS

This application claims priority under 35 U.S.C. § 119 to JP Application No. 2022-080559 filed May 17, 2022 the entire contents of which are hereby incorporated by reference.

TECHNICAL FIELD

The present invention primarily relates to a work vehicle having a cruise control function.

BACKGROUND ART

A work vehicle according to Patent Document 1 includes a cruise control operating tool. An operator rotates the cruise control operating tool to fix the gear of a transmission so that the work vehicle may travel at a constant speed. In the work vehicle according to Patent Document 1, when a brake pedal is operated in a state where cruise control is enabled, the operating force is transmitted to the cruise control operating tool via a link mechanism. As a result, the cruise control operating tool rotates to cancel cruise control.

PRIOR ART DOCUMENT

Patent Document

Patent Document 1: Japanese Patent Laid-open Publication No. 2017-178044

SUMMARY OF INVENTION

Technical Problem

In the work vehicle according to Patent Document 1, a single brake pedal is provided. In some work vehicles, a pair of brake pedals is provided on right and left. Patent Document 1 merely describes using the single brake pedal to cancel cruise control, but does not describe the action in a case where the pair of brake pedals is provided on right and left.

The present invention has been made in view of the above circumstance, and its primary object is to provide the configuration with desirable operability for the work vehicle that has the cruise control function and includes a pair of brake pedals on right and left.

Solution to Problem and Advantageous Effects of Invention

The problem to be solved by the present invention is as described above, and the solution for this problem and its advantageous effect will be described below.

According to an aspect of the present invention, a work vehicle having the configuration below is provided. Specifically, the work vehicle includes traveling units, a transmission, brake pedals, a brake device, a cruise control operating tool, and a cruise control device. The pair of traveling units is provided on right and left. The transmission shifts a gear for a vehicle speed. The pair of brake pedals is provided on right and left. The brake device individually actuates brakes for the traveling units on right and left when the brake pedal is operated. The cruise control device fixes the gear of the transmission when the cruise control operating tool is operated, cancels the fixed gear of the transmission when the brake pedal on the left is operated, and cancels the fixed gear of the transmission when the brake pedal on the right is operated.

Thus, cruise control may be canceled by operating either the right or left brake pedal so that the work vehicle with desirable operability may be achieved.

The above-described work vehicle preferably has the configuration below. Specifically, the cruise control operating tool is operated to switch between a fixed state where the gear of the transmission is fixed and a canceled state where the fixed state is canceled. The cruise control device includes a cancel mechanism that switches from the fixed state to the canceled state. A first brake pedal on one of right and left sides is coupled to the cancel mechanism via a wire. A second brake pedal on an other of the right and left sides is coupled to the cancel mechanism via a shaft.

This may achieve low costs as compared to the configuration in which the fixed state is canceled by electric signals.

While the first brake pedal is coupled to the cancel mechanism using the wire, the second brake pedal may be coupled to the cancel mechanism using the shaft in an available space used.

In the work vehicle described above, preferably, a gap is formed in at least one of a mechanism that transmits an operating force applied to the first brake pedal to the cancel mechanism and a mechanism that transmits an operating force applied to the second brake pedal to the cancel mechanism, and when the first brake pedal or the second brake pedal is operated beyond the gap, the cancel mechanism is actuated.

This eliminates the need to adjust the cancel mechanism even when the stroke of the brake pedal is adjusted.

The above-described work vehicle preferably has the configuration below. Specifically, the first brake pedal and the second brake pedal are capable of being coupled to each other. The first brake pedal and the second brake pedal are different in an amount of operation needed to actuate the cancel mechanism. When the first brake pedal and the second brake pedal are operated in a coupled state, an operating force is transmitted to the cancel mechanism via only any one of the shaft and the wire.

This makes it possible to actuate the cancel mechanism via one specific mechanism even in a state where the right and left brake pedals are coupled to each other.

The above-described work vehicle preferably has the configuration below. Specifically, the cruise control operating tool is operated to switch between a fixed state where the gear of the transmission is fixed and a canceled state where the fixed state is canceled. A restriction member is provided to, in a state where the brake pedal is operated, restrict the cruise control operating tool from being operated to switch from the canceled state to the fixed state.

This may prevent the cruise control device from switching to the fixed state in a state where the brake is actuated.

The above-described work vehicle preferably has the configuration below. Specifically, the cruise control device includes a cancel mechanism that switches from the fixed state to the canceled state. The restriction member also serves as the cancel mechanism.

This may reduce the number of parts.

3

Figure 2:
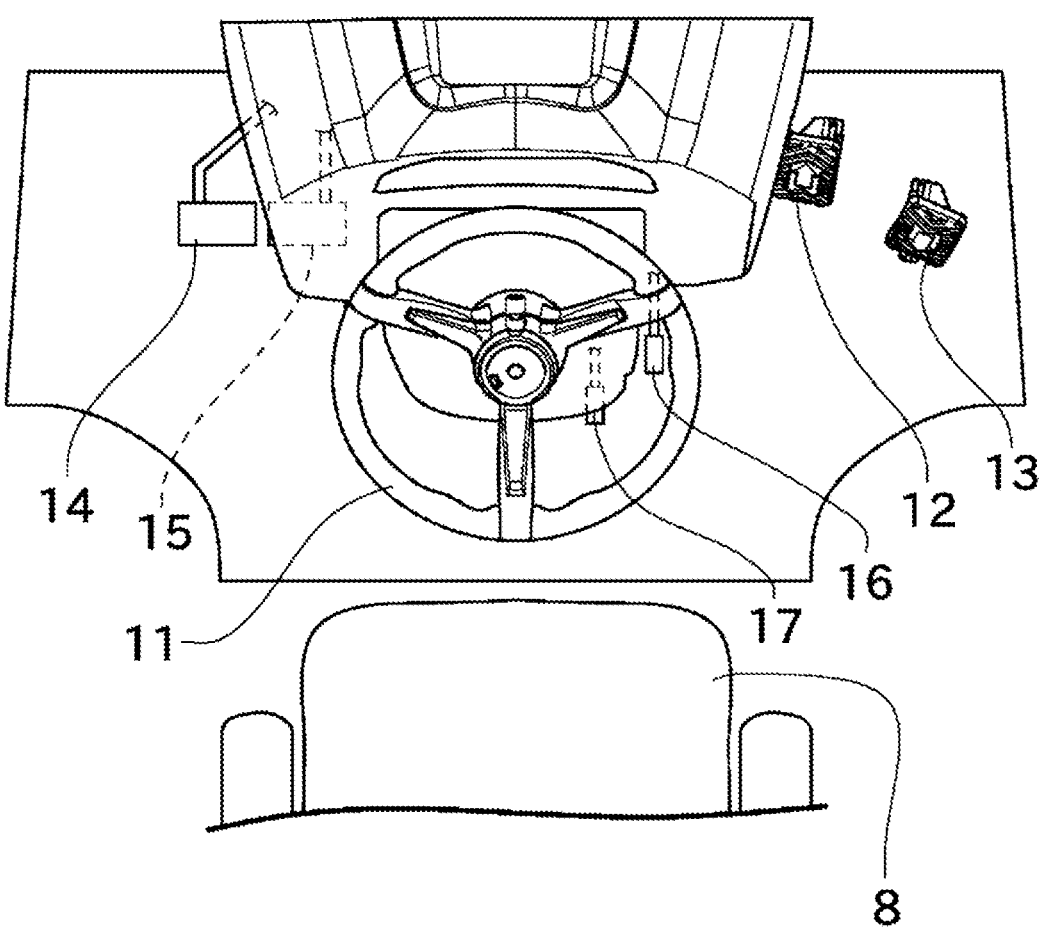

FIG. 2 is a plan view of operating tools provided near a driver's seat.

Figure 3:
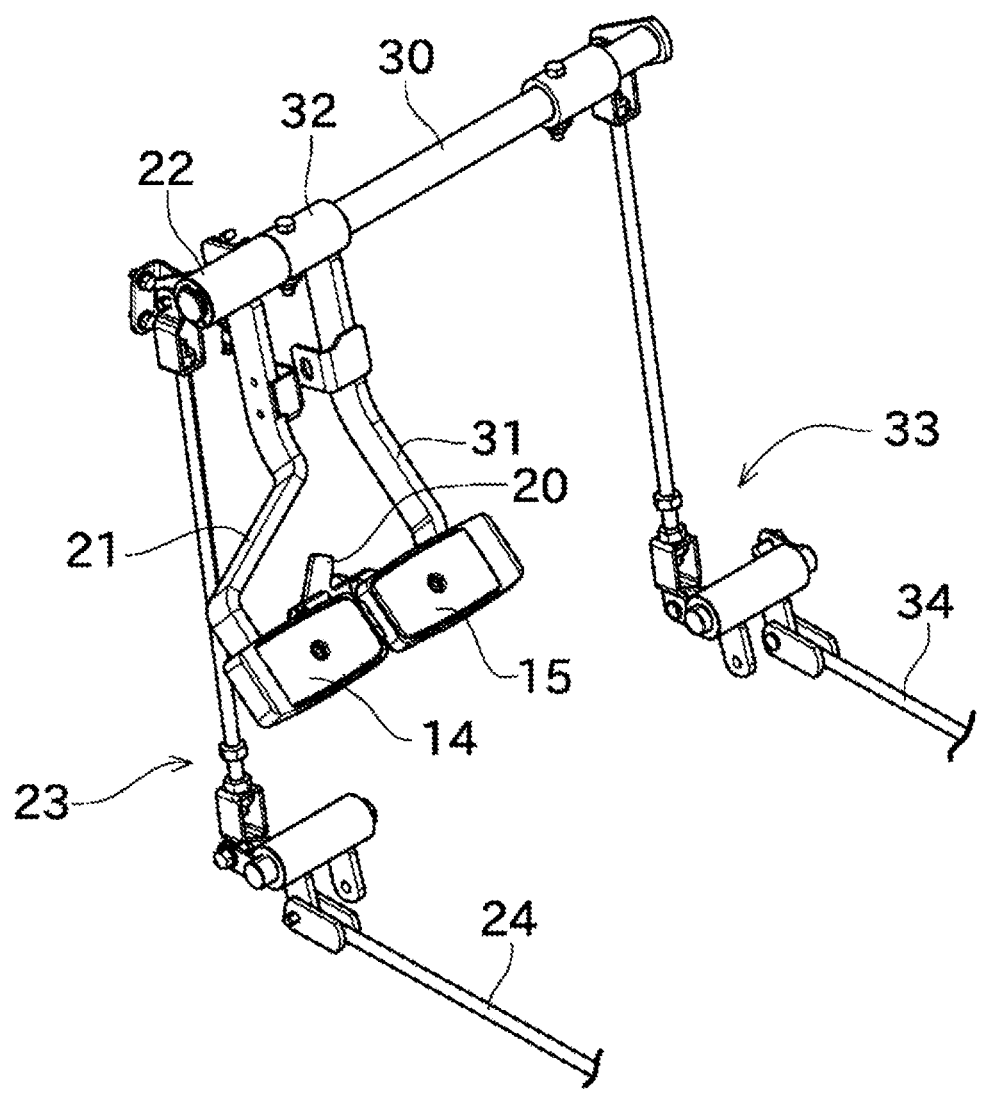

FIG. 3 is a perspective view illustrating a mechanism that transmits operating forces applied to brake pedals.

Figure 4:
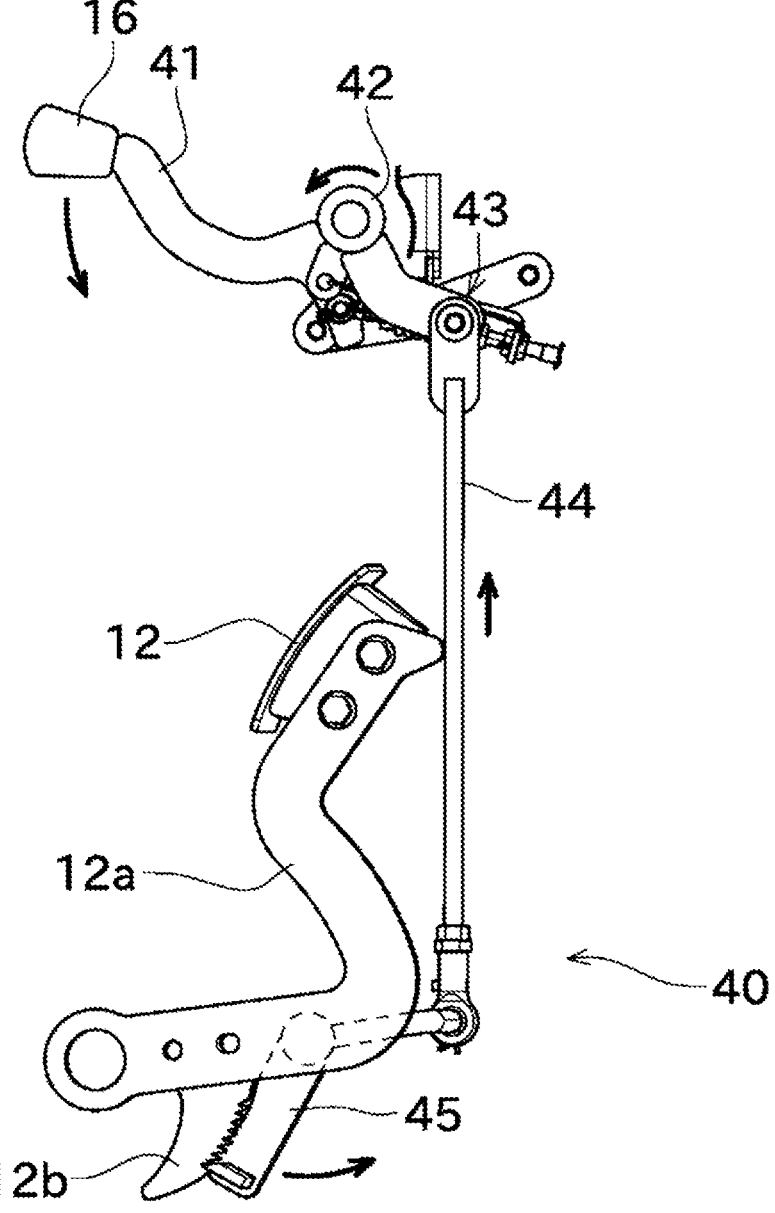

FIG. 4 is a side view illustrating a mechanism that transmits an operating force applied to a cruise control operating tool.

Figure 5:
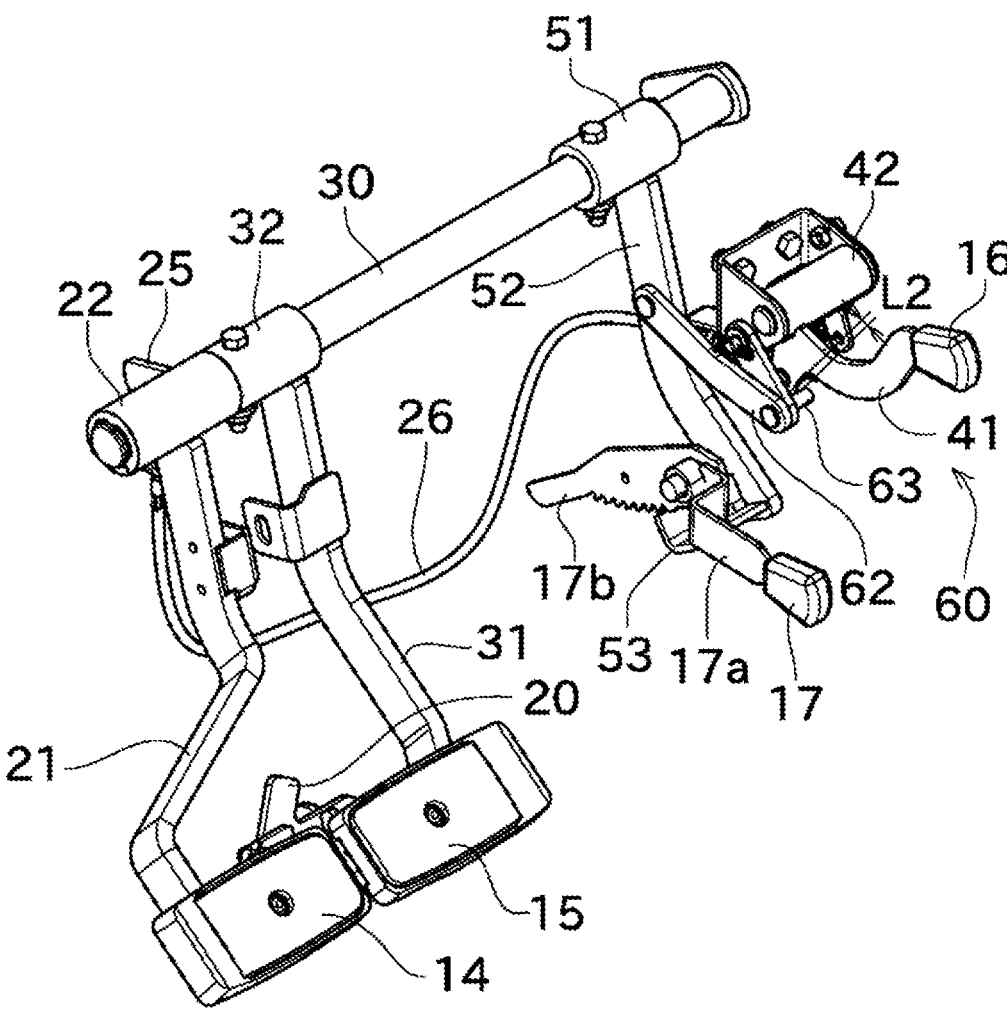

FIG. 5 is a first perspective view illustrating that cruise control is canceled by operating the brake pedal.

Figure 6:
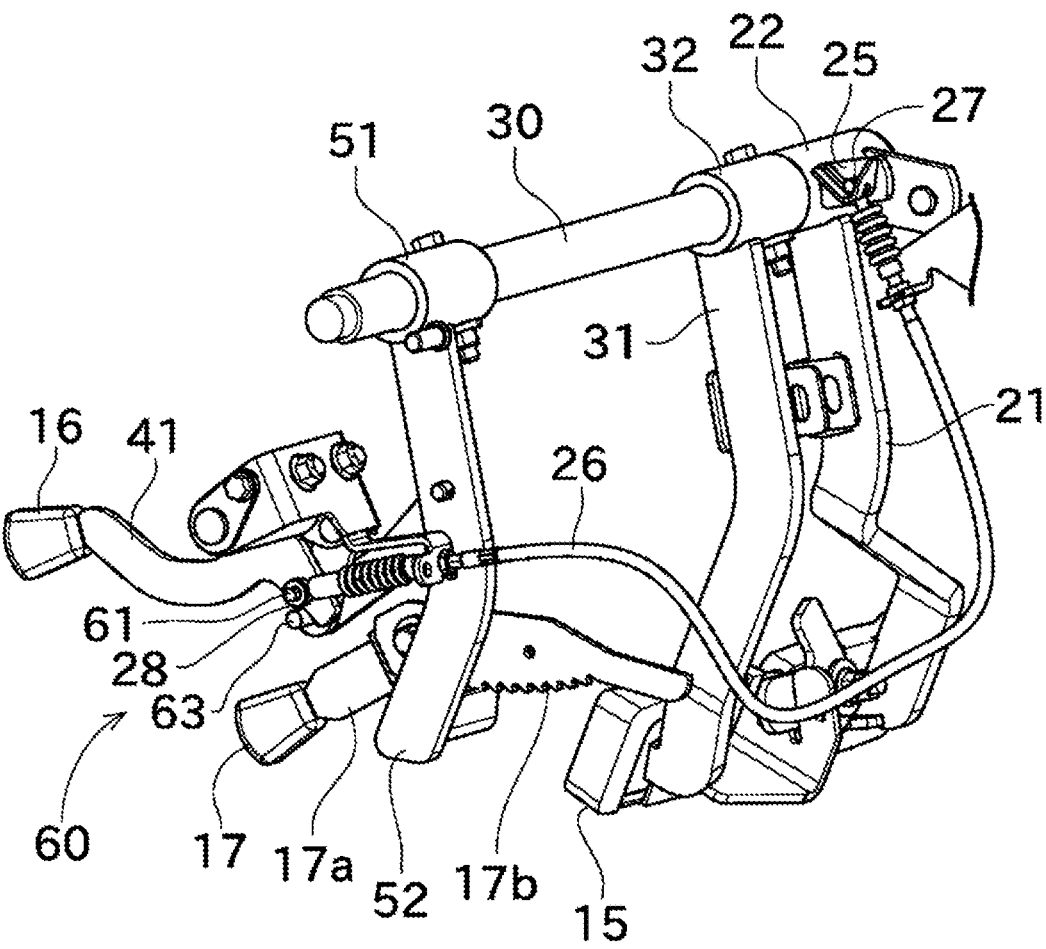

FIG. 6 is a second perspective view illustrating that cruise control is canceled by operating the brake pedal.

Figure 7:
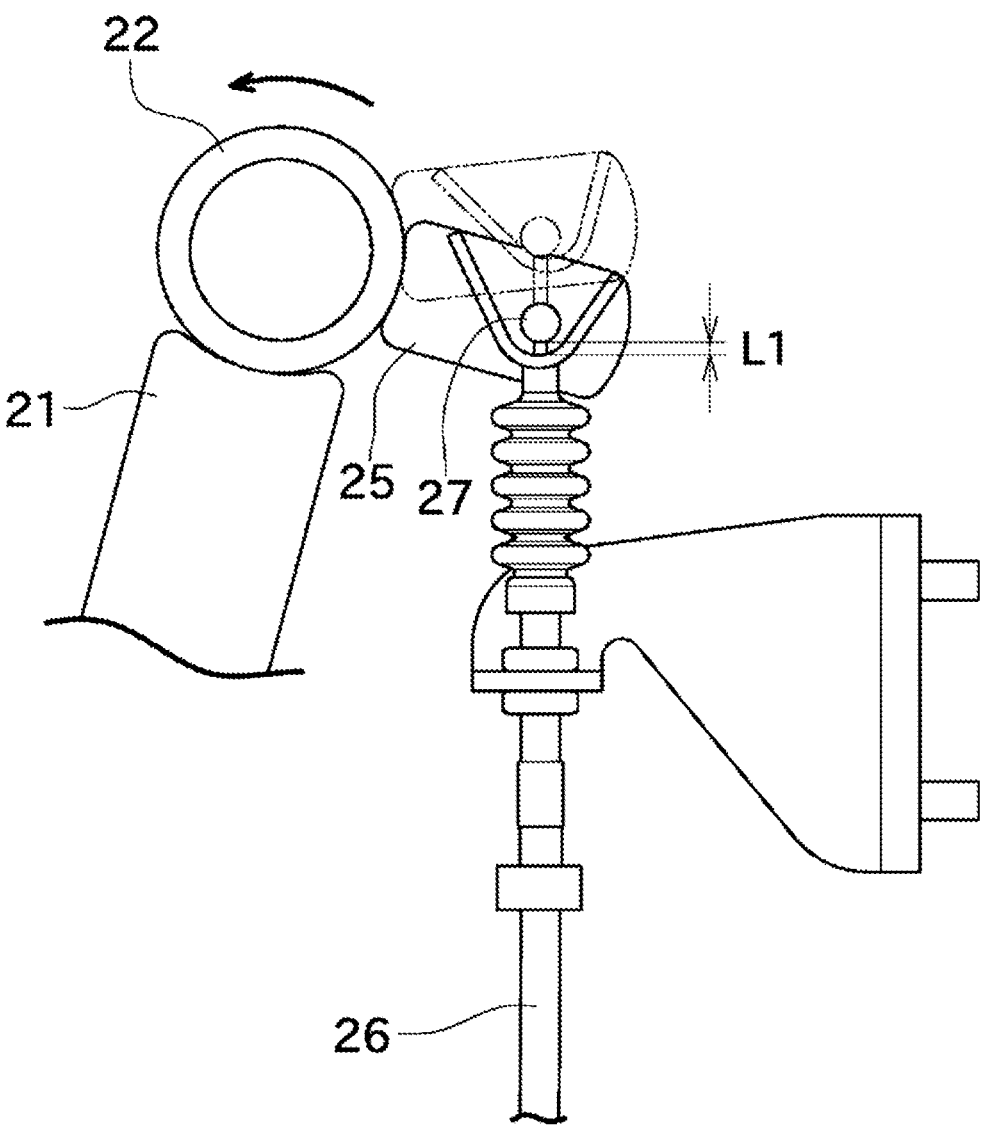

FIG. 7 is a side view illustrating a state where a first wire end portion is pulled by using a wire operating member.

Figure 8:
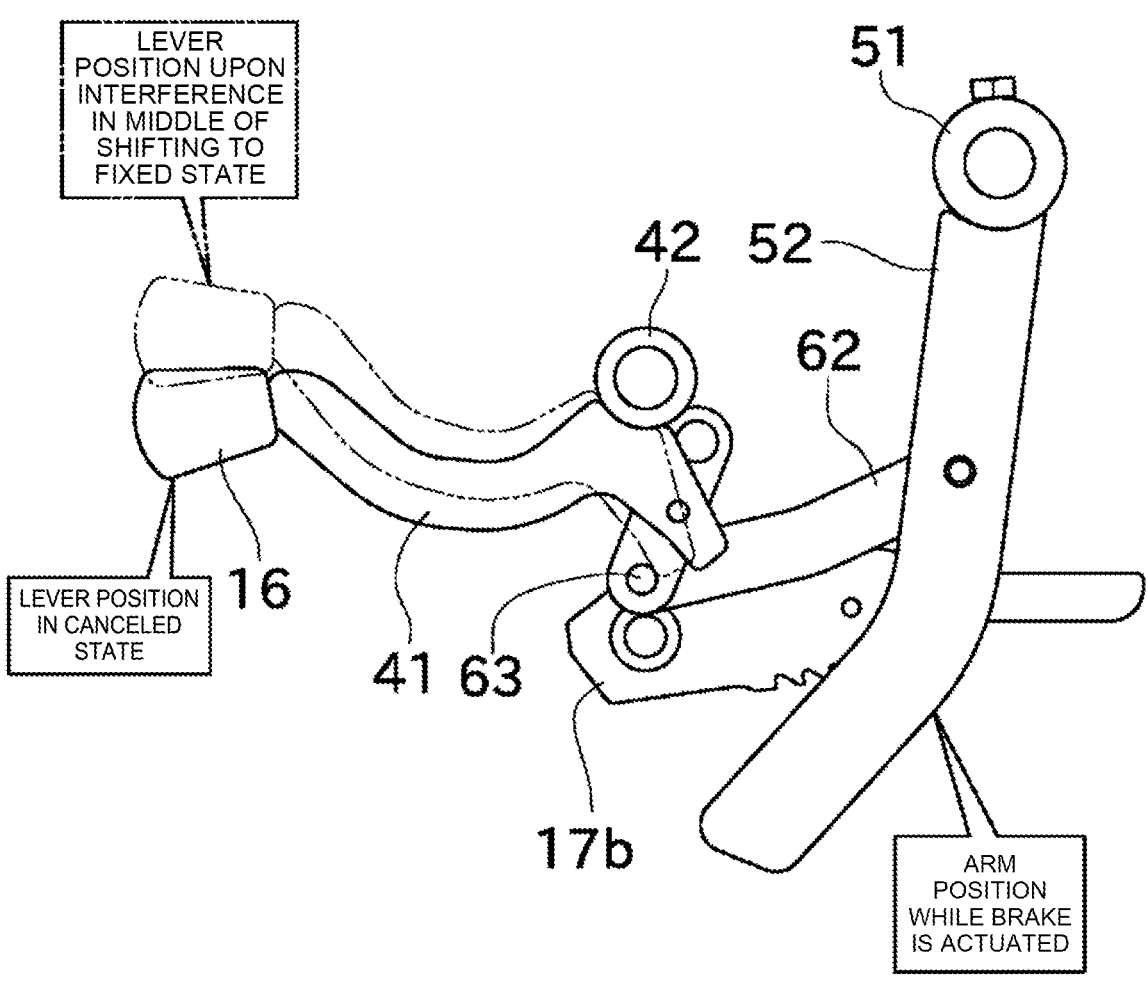

FIG. 8 is a side view illustrating that cruise control cannot be started while the brake is actuated.

Figure 9:
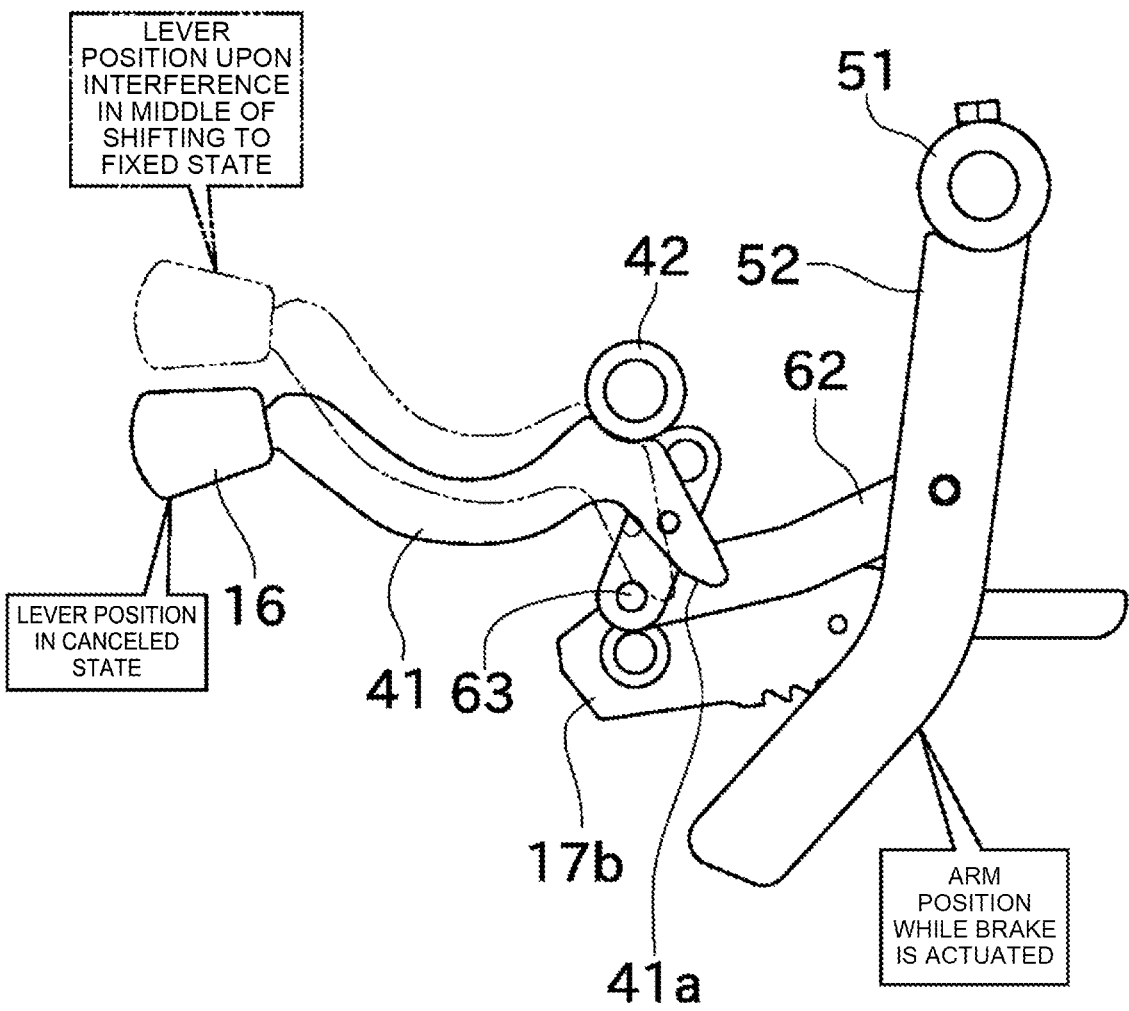

FIG. 9 is a side view of the shape of an operating arm according to a modification.

Figure 10:
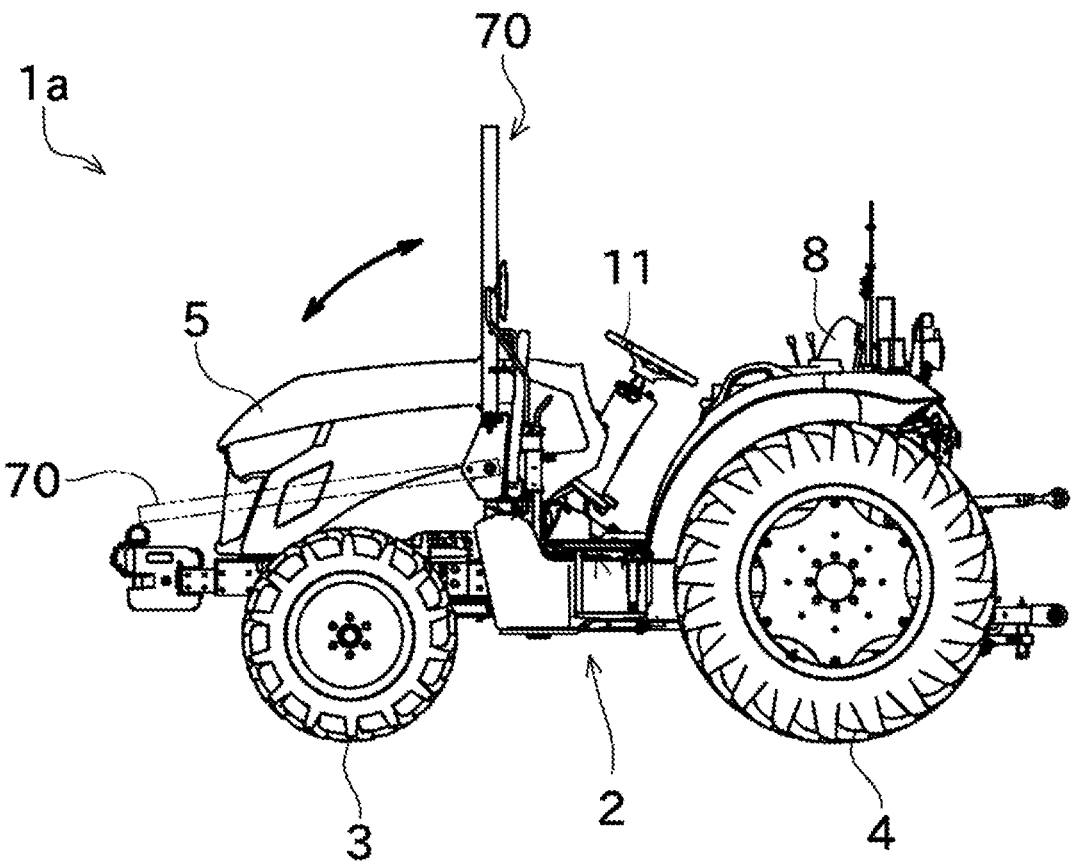

FIG. 10 is a side view of a tractor including an overturning protection frame.

Figure 11:
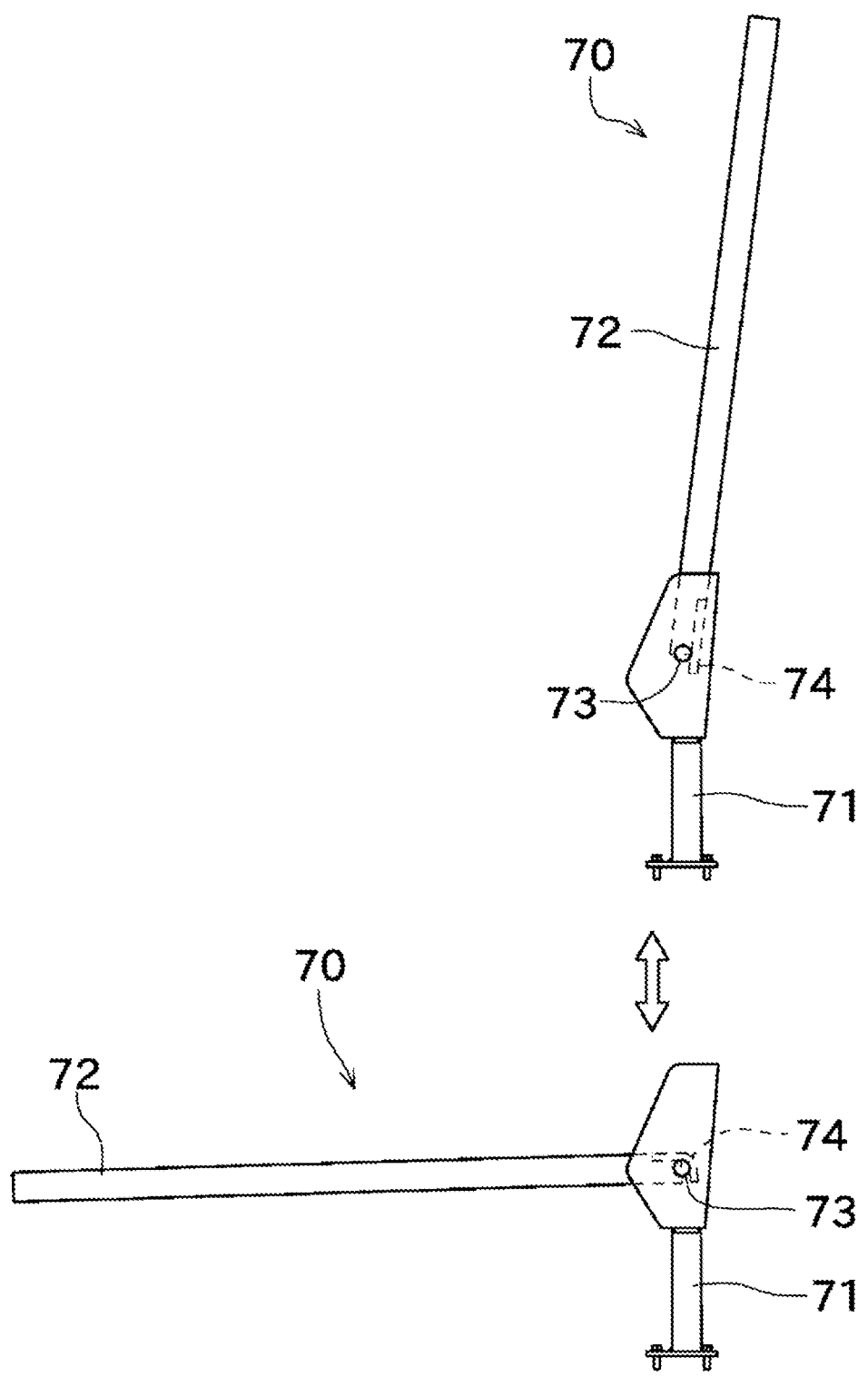

FIG. 11 is a side view illustrating a structure of the overturning protection frame.

DESCRIPTION OF EMBODIMENTS

Figure 1:
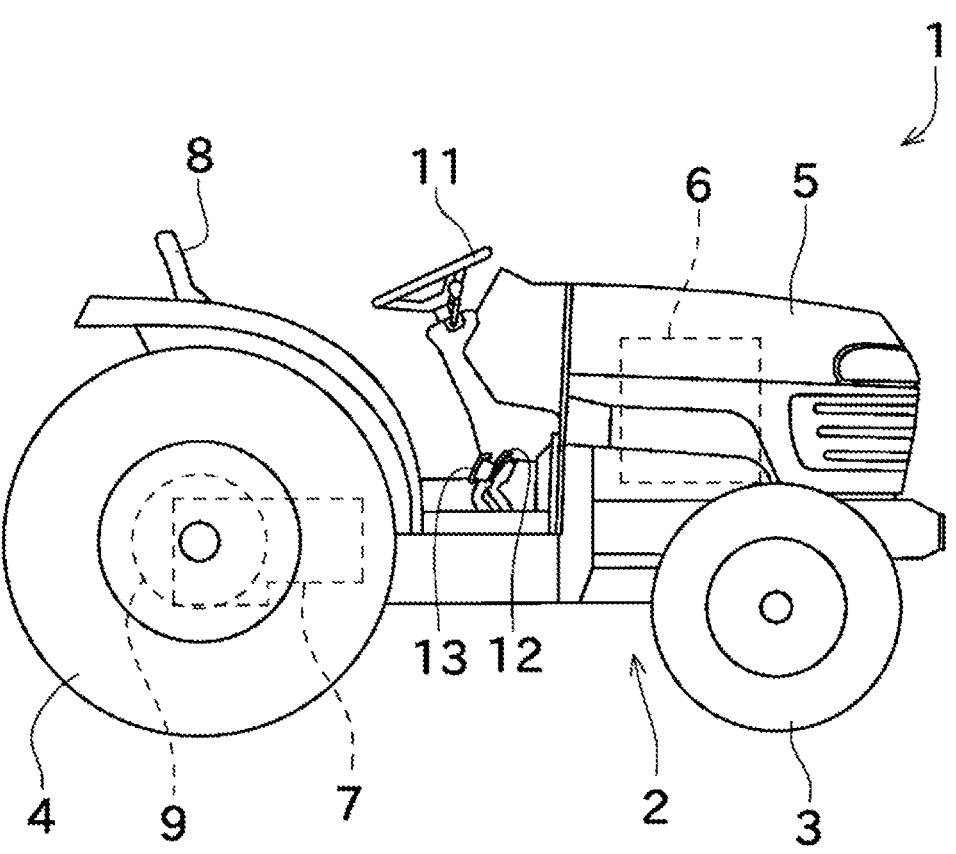
FIG. 1 is a side view of a tractor according to an embodiment of the present invention.

Next, an embodiment of the present invention will be described with reference to the drawings. FIG. 1 is a side view of a tractor (work vehicle) 1 according to an embodiment of the present invention. FIG. 2 is a plan view of the tractor 1. "Right", "left", and the like, used in the following description refer to right and left as viewed from the operator boarding the tractor 1.

The tractor 1 according to the present embodiment is a work vehicle used for agricultural or civil engineering work. The tractor 1 includes a vehicle body 2 including a frame, and the like, extending in a front-back direction. The vehicle body 2 is supported by front wheels 3 and rear wheels 4 that are traveling units. The pair of front wheels 3 and the pair of rear wheels 4 are provided on right and left. Crawlers may be provided instead of the wheels.

A hood 5 is provided in a front portion of the tractor 1. An engine 6, which is a drive unit, is provided inside the hood 5. The engine 6 generates power. Although the engine 6 is a diesel engine, the engine 6 may also be a gasoline engine. An electric motor may be provided instead of the engine 6.

A transmission 7 is provided in a rear portion of the vehicle body 2. The power output by the engine 6 is input to the transmission 7. The transmission 7 is specifically an HST (hydro static continuously variable transmission). The transmission 7 includes a hydraulic pump, a hydraulic motor, and various drive transmission shafts. The hydraulic pump is driven by power of the engine to thus discharge oil. The hydraulic motor is actuated by the oil discharged by the hydraulic pump to rotate the drive transmission shaft. The drive transmission shaft is coupled to the rear wheel 4. Thus, the tractor 1 may travel by using the power output from the engine 6. The hydraulic pump includes a movable swash plate that changes the amount of discharged oil in accordance with the inclination angle, and the rotation velocity of the drive transmission shaft is changed in accordance with the inclination angle of the movable swash plate so that the rotation velocity (i.e., velocity) of the rear wheel 4 may be changed. An HMT or a mechanical transmission may be provided instead of the HST. A PTO shaft (not illustrated) is coupled to the transmission 7. A work machine may be mounted on the PTO shaft. The power of the engine 6 is output from the PTO shaft via the transmission 7.

A driver's seat 8 for the operator to sit in is provided behind the hood 5. Around the driver's seat 8, various operating tools are provided for the operator to perform various operations. Specifically, as illustrated in FIG. 2, a steering wheel 11, a forward pedal 12, a backward pedal 13, a left brake pedal 14, a right brake pedal 15, a cruise control operating tool 16, and a parking brake operating tool 17 are provided around the driver's seat 8.

When the operator operates the forward pedal 12, the drive transmission shaft of the transmission 7 rotates in the direction that moves the tractor 1 forward. This allows the tractor 1 to move forward. When the operator operates the backward pedal 13, the drive transmission shaft of the transmission 7 rotates in the direction that moves the tractor 1 backward. This allows the tractor 1 to move backward. A change in the inclination angle of the movable swash plate depends on how much the forward pedal 12 or the backward pedal 13 is depressed, and thus the shift transmission may be performed.

A brake device 9 is provided for each of the right and left rear wheels 4. The brake device 9 is a disc brake including a rotary plate that rotates together with the rear wheel 4 and an actuation member that comes into contact with the rotary plate to decelerate or stop the rotation. When the operator operates the left brake pedal 14, the actuation member of the brake device 9 on the left side is actuated to apply a brake to the rear wheel 4 on the left side. Conversely, when the operator operates the right brake pedal 15, the actuation member of the brake device 9 on the right side is actuated to apply a brake to the rear wheel 4 on the right side. A mechanism that transmits the power from the left brake pedal 14 or the right brake pedal 15 to the brake device 9 will be described below.

The cruise control operating tool 16 is an operating tool that performs a cruise control function. The cruise control function is a function that fixes the gear of the transmission 7 to cause the tractor 1 to travel at a constant speed without any operation by the operator. The operator may operate the cruise control operating tool 16 to switch between a fixed state where the gear is fixed and a canceled state where the fixed state is canceled. A mechanism to perform the cruise control will be described below.

The parking brake operating tool 17 is an operating tool that actuates a parking brake. The parking brake is a brake that is used when the tractor 1 is parked and that maintains the braking force even when the operator leaves the driver's seat 8. The operator may operate the parking brake operating tool 17 to switch between a brake actuated state where the parking brake is enabled and a brake canceled state where the parking brake is canceled. A mechanism to perform the parking brake will be described below.

Next, with reference to FIG. 3, the mechanism that transmits the operating forces applied to the left brake pedal 14 and the right brake pedal to the brake device 9 will be described.

FIG. 3 illustrates a left brake arm 21, a left brake shaft 22, a left brake transmission link 23, and a left brake actuation member 24 as the mechanism that transmits the operating force applied to the left brake pedal 14 to the brake device 9. One end of the left brake arm 21 is coupled to the left brake pedal 14, and the other end of the left brake arm 21 is coupled to the left brake shaft 22.

The left brake shaft 22 is rotatable relative to a base shaft 30. Thus, when the operation is performed to depress the left brake pedal 14, the left brake shaft 22 may rotate with respect to the base shaft 30.

The left brake transmission link 23 is coupled to the left brake shaft 22. The left brake transmission link 23 includes a rod that moves up and down in conjunction with the rotation of the left brake shaft 22, a shaft that rotates in accordance with the rotation of the rod, etc. The left brake actuation member 24 is coupled to the left brake transmission link 23. The operating force applied to the left brake pedal 14 is transmitted to slide the left brake actuation member 24 in a forward and backward direction. The brake device 9 is coupled to the other end of the left brake actuation member 24, and the brake is actuated using the transmitted operating force.

FIG. 3 illustrates a right brake arm 31, a right brake shaft 32, the base shaft 30, a right brake transmission link 33, and a right brake actuation member 34 as the mechanism that transmits the operating force applied to the right brake pedal 15 to the brake device 9. One end of the right brake arm 31 is coupled to the right brake pedal 15, and the other end of the right brake arm 31 is coupled to the right brake shaft 32.

The right brake shaft 32 is fixed to the base shaft 30, and the right brake shaft 32 and the base shaft 30 rotate together. The right brake transmission link 33 and the right brake actuation member 34 are coupled to the base shaft 30. The right brake transmission link 33 and the right brake actuation member 34 have substantially the same or symmetrical configuration as the left brake transmission link 23 and the left brake actuation member 24, and therefore the descriptions thereof are omitted.

As described above, according to the present embodiment, the left brake pedal 14 and the right brake pedal 15 are provided independently so as to allow the left and right brake devices 9 to operate independently. The left brake pedal 14 and the right brake pedal 15 may be coupled to each other by using a brake coupling member 20. In this case, one of the left brake pedal 14 and the right brake pedal 15 is simply operated to simultaneously rotate the other brake pedal, and thus both the right and left brake devices 9 may be actuated.

Next, with reference to FIG. 4, a cruise control device 40 will be described.

The cruise control device 40 operates based on the operating force applied to the cruise control operating tool 16 to switch between the fixed state and the canceled state described above. As illustrated in FIG. 4, the cruise control device 40 includes an operating arm 41, a transmission shaft 42, a link 43, a rod 44, and a movable engagement portion 45.

One end of the operating arm 41 is coupled to the cruise control operating tool 16. The other end of the operating arm 41 is coupled to the transmission shaft 42. The link 43 is further fixed to the transmission shaft 42. The rod 44 is coupled to the link 43. The link 43 swings up and down to allow the rod 44 to slide up and down. The movable engagement portion 45 is coupled to the rod 44 via a link. The cruise control operating tool 16 swings up and down so that the movable engagement portion 45 moves close to or away from a fixed engagement portion 12b.

A pedal arm 12a is coupled to the forward pedal 12. The fixed engagement portion 12b is coupled to the pedal arm 12a. The forward pedal 12, the pedal arm 12a, and the fixed engagement portion 12b may swing together.

Here, the fixed engagement portion 12b has a shape like a comb. The movable engagement portion 45 includes a tapered protruding portion. The protruding portion of the movable engagement portion 45 may engage with a comb-shaped recessed portion of the fixed engagement portion 12b. This allows the tilt angle of the forward pedal 12 to be maintained constant. As a result, the gear of the transmission 7 is fixed, and thus the traveling speed of the tractor 1 may be maintained constant. When the cruise control operating tool 16 is swung downward in this state, the movable engagement portion 45 is moved away from the fixed engagement portion 12b so that the fixed state may be canceled.

In the tractor 1 according to the present embodiment, the fixed state of the cruise control device 40 is canceled when the left brake pedal 14 or the right brake pedal 15 is operated as well as when the cruise control operating tool 16 is operated. The structure for this purpose will be described in detail below.

First, with reference to FIGS. 5 to 7, the structure to cancel the fixed state of the cruise control device 40 using the operating force applied to the left brake pedal 14 will be described. As described above, the application of the operating force to the left brake pedal 14 causes the left brake shaft 22 to rotate. As illustrated in FIGS. 5 and 6, a wire operating member 25 is fixed to an outer surface of the left brake shaft 22.

The wire operating member 25 rotates together with the left brake shaft 22. The wire operating member 25 is rotated to operate a wire. The wire is inserted into a wire tube 26 illustrated in FIGS. 5 and 6. A first wire end portion 27, which is one end of the wire, is attached to the wire operating member 25. As illustrated in FIG. 7, when the left brake pedal 14 is operated to rotate the left brake arm 21 and the left brake shaft 22, the wire operating member 25 is rotated upward. This causes the wire operating member 25 to come into contact with the first wire end portion 27 and pull the wire.

As illustrated in FIG. 7, a gap L1 is formed between the wire operating member 25 and the first wire end portion 27 when the cruise control device 40 is in a fixed state and no operating force is applied to the left brake pedal 14. Accordingly, the wire operating member 25 does not pull the wire immediately after the left brake pedal 14 is started to be depressed, but the wire operating member 25 pulls the wire when the left brake pedal 14 is operated for the amount corresponding to the gap L1.

If the gap L1 were zero, the following issues would arise. That is, the adjustment on the stroke of the left brake pedal 14 due to abrasion, rattling, or the like, of the brake device 9 may result in a situation where the wire is pulled even in a state where the left brake pedal 14 is not being operated. Such a case causes the trouble of adjusting the wire. In this regard, as the gap L1 is formed, there is basically no need to adjust the wire even when the stroke of the left brake pedal 14 is adjusted.

A second wire end portion 28, which is the other end of the wire, is coupled to the operating arm 41. In detail, the cruise control device 40 includes a cancel mechanism 60 that cancels the fixed state in accordance with the brake operation. The cancel mechanism 60 includes a wire coupling portion 61 attached to the operating arm 41. The wire coupling portion 61 couples the second wire end portion 28 to the operating arm 41. The wire coupling portion 61 is mounted in such a position that the fixed state of the cruise control device 40 is canceled when the wire is pulled. That is, according to the present embodiment, the fixed state is canceled when the cruise control operating tool 16 rotates downward. Therefore, the wire coupling portion 61 is provided in such a position that the cruise control operating tool 16 rotates downward when the wire is pulled.

As described above, the left brake pedal 14, which is a first brake pedal, is coupled to the cancel mechanism 60 via the mechanism including the wire.

Next, mainly with reference to FIG. 5, the structure to cancel the fixed state of the cruise control device 40 by using the operating force applied to the right brake pedal 15 will be described. As described above, the application of the operating force to the right brake pedal 15 causes the base shaft 30 to rotate. After being applied to the right brake pedal 15 and transmitted to the base shaft 30, the operating force is transmitted to a cancel link 62 of the cancel mechanism 60 via a second brake shaft 51 and a second brake arm 52 illustrated in FIG. 5.

The second brake shaft 51 is fixed to the base shaft 30, and the second brake shaft 51 rotates together with the base shaft 30. One end of the second brake arm 52 is fixed to the second brake shaft 51, and the second brake arm 52 rotates together with the second brake shaft 51. The cancel link 62 is coupled to an intermediate portion of the second brake arm 52. The cancel link 62 couples the intermediate portion of the second brake arm 52 to a member supporting the transmission shaft 42. A cancel pin 63 is attached to the cancel link 62. With the above configuration, the cancel pin 63 may be moved by operating the right brake pedal 15.

Here, the cancel pin 63 is provided near the operating arm 41. When the operating force is applied to the right brake pedal 15, the cancel pin 63 presses the operating arm 41 to rotate the operating arm 41. The direction in which the cancel pin 63 rotates the operating arm 41 is the direction in which the fixed state of the cruise control device 40 is canceled. As described above, the operating force applied to the right brake pedal 15 may cancel the fixed state of the cruise control device 40.

As illustrated in FIG. 5, a gap L2 is formed between the cancel pin 63 and the operating arm 41 when the cruise control device 40 is in the fixed state and no operating force is applied to the right brake pedal 15. Accordingly, the cancel pin 63 does not press the operating arm 41 immediately after the right brake pedal 15 is started to be depressed, but the cancel pin 63 presses the operating arm 41 when the right brake pedal 15 is operated for the amount corresponding to the gap L2.

According to the present embodiment, the amount of operation of the left brake pedal 14 corresponding to the gap L1 between the wire operating member 25 and the first wire end portion 27 is larger than that of the right brake pedal 15 corresponding to the gap L2 between the cancel pin 63 and the operating arm 41. Therefore, when the left brake pedal 14 and the right brake pedal 15 are coupled and operated, the cancel pin 63 and the operating arm 41 come into contact with each other before the wire operating member 25 and the first wire end portion 27. As a result, the cancel pin 63 presses the operating arm 41 so that the fixed state of the cruise control device 40 is canceled. The amount of operation of the left brake pedal 14 corresponding to the gap L1 between the wire operating member 25 and the first wire end portion 27 may be smaller than that of the right brake pedal 15 corresponding to the gap L2 between the cancel pin 63 and the operating arm 41.

As described above, the right brake pedal 15, which is a second brake pedal, is coupled to the cancel mechanism 60 via the mechanism including the shaft (the base shaft 30).

Here, the second brake arm 52 is used not only to cancel the fixed state of the cruise control device 40 but also to actuate the parking brake. As illustrated in FIG. 5, a lever arm 17a and a lever-side engagement portion 17b are coupled to the parking brake operating tool 17. The parking brake operating tool 17, the lever arm 17a, and the lever-side engagement portion 17b rotate together.

The lever-side engagement portion 17b has a shape like a comb. Furthermore, the other end of the second brake arm 52 is coupled to an arm-side engagement portion 53 that enters a comb-shaped recessed portion of the lever-side engagement portion 17b. Specifically, the parking brake operating tool 17 is operated to engage the lever-side engagement portion 17b with the arm-side engagement portion 53 so that the base shaft 30 may be maintained in a rotated state.

As a result, the brake device 9 may be actuated without operating the right brake pedal 15. The left brake pedal 14 and the right brake pedal 15 are coupled to each other during parking, and therefore the brake device 9 on the left side may also be actuated.

The tractor 1 includes a mechanism that prohibits the cruise control device 40 from switching from the canceled state to the fixed state in a state where the brake is actuated. This may prevent cruise control from being enabled at a time when the operator intends to decelerate.

FIG. 8 illustrates the positions of the second brake arm 52, the cancel link 62, and the cancel pin 63 while the brake is actuated. Furthermore, the position of the cruise control operating tool 16 in the canceled state is indicated in a solid line. Here, when the operator rotates the cruise control operating tool 16 upward (i.e., when the operation is performed to switch from the canceled state to the fixed state), the operating arm 41 interferes with the cancel pin 63 as indicated in a chain line in FIG. 8.

In other words, when the cruise control operating tool 16 is operated from the canceled state toward the fixed state, the action trajectory of the operating arm 41 interferes with the position of the cancel pin 63 in a state where the brake is actuated.

Therefore, switching the cruise control device 40 from the canceled state to the fixed state is restricted in a state where the brake is actuated. According to the present embodiment, as the cancel pin 63, which is part of the cancel mechanism 60, functions as a restriction member, the number of parts may be reduced compared to a configuration in which a dedicated restriction member is provided. A dedicated restriction member may be provided.

The shape of the operating arm 41 illustrated in FIG. 8 is an example, and the operating arm 41 may have the shape illustrated in FIG. 9. The operating arm 41 illustrated in FIG. 9 has a contact surface 41a formed at the end portion on the opposite side of the cruise control operating tool 16. The contact surface 41a is a portion where the contour of the lever is straight. When the cruise control operating tool 16 is operated from the canceled state toward the fixed state, the action trajectory of the contact surface 41a interferes with the position of the cancel pin 63 in a state where the brake is actuated. As the contact surface 41a is straight instead of being curved, the operating arm 41 may be stopped securely when the contact surface 41a is in contact with the cancel pin 63.

Next, with reference to FIGS. 10 and 11, a tractor 1a different from the above embodiment will be described. The tractor 1a includes an overturning protection frame 70. The overturning protection frame 70 is a member that protects the operator in the driver's seat 8 when the tractor 1a is overturned.

The overturning protection frame 70 is provided in the front and at least on the side of the driver's seat 8. As indicated in a bold arrow in FIG. 10, the overturning protection frame 70 may switch its posture between an upright posture (solid line) and a horizontal posture (chain line).

As illustrated in FIG. 11, the overturning protection frame 70 includes a lower frame 71 and an upper frame 72. The upper frame 72 is rotated relative to the lower frame 71 with a rotary shaft 73 so that the overturning protection frame 70 may be switched between the upright posture and the horizontal posture.

The lower frame 71 and the upper frame 72 are U-shaped in cross-section and have openings. A rubber plate 74 is provided in the opening of the upper frame 72. The rubber plate 74 is provided at the position including an end portion of the upper frame 72 on the lower frame 71 side (in other words, the position including the rotary shaft 73). Thus, the rubber plate 74 is bent in the horizontal posture and is straight in the upright posture. Therefore, the elastic force of the rubber plate 74 may reduce the operating load when switching the overturning protection frame 70 from the horizontal posture to the upright posture.

According to the present embodiment, the rubber plate 74 is provided for the upper frame 72, but a block-shaped rubber body capable of closing the opening of the upper frame 72 may be provided for the upper frame 72. The rubber plate 74 or the rubber body may be provided across both the upper frame 72 and the lower frame 71.

The tractor 1 according to the present embodiment has Feature 1 below. Specifically, the tractor 1 includes the rear wheels 4, the transmission 7, the brake pedals (the left brake pedal 14 and the right brake pedal 15), the brake device 9, the cruise control operating tool 16, and the cruise control device 40. The pair of rear wheels 4 is provided on right and left. The transmission 7 shifts the gear for the vehicle speed. The pair of brake pedals is provided on right and left. The brake device 9 individually actuates brakes for the rear wheels 4 on right and left when the brake pedal is operated. The cruise control device 40 fixes the gear of the transmission 7 when the cruise control operating tool 16 is operated, cancels the fixed gear of the transmission 7 when the left brake pedal 14 is operated, and cancels the fixed gear of the transmission 7 when the right brake pedal 15 is operated.

Thus, cruise control may be canceled by operating either the right or left brake pedal so that the tractor 1 with desirable operability may be achieved.

The tractor 1 according to the present embodiment has Feature 2 below. Specifically, in the tractor 1, the cruise control operating tool 16 is operated to switch between a fixed state where the gear of the transmission 7 is fixed and a canceled state where the fixed state is canceled. The cruise control device 40 includes the cancel mechanism 60 that switches from the fixed state to the canceled state. The left brake pedal 14 is coupled to the cancel mechanism 60 via the wire. The right brake pedal 15 is coupled to the cancel mechanism 60 via the shaft.

This may achieve low costs as compared to the configuration in which the fixed state is canceled by electric signals.

While the left brake pedal 14 is coupled to the cancel mechanism 60 using the wire, the right brake pedal 15 may be coupled to the cancel mechanism 60 using the shaft in an available space used.

The tractor 1 according to the present embodiment has Feature 3 below. Specifically, in the tractor 1, a gap is formed in at least one of the mechanism that transmits the operating force applied to the left brake pedal 14 to the cancel mechanism 60 and the mechanism that transmits the operating force applied to the right brake pedal 15 to the cancel mechanism 60, and when the left brake pedal 14 or the right brake pedal 15 is operated beyond the gap, the cancel mechanism 60 is actuated.

This eliminates the need to adjust the cancel mechanism 60 even when the stroke of the brake pedal is adjusted.

The tractor 1 according to the present embodiment has Feature 4 below. Specifically, in the tractor 1, the left brake pedal 14 and the right brake pedal 15 are capable of being coupled to each other. The left brake pedal 14 and the right brake pedal 15 are different in an amount of operation needed to actuate the cancel mechanism 60. When the left brake pedal 14 and the right brake pedal 15 are operated in a coupled state, the operating force is transmitted to the cancel mechanism 60 via only any one of the shaft and the wire.

This makes it possible to actuate the cancel mechanism via one specific mechanism even in a state where the right and left brake pedals are coupled to each other.

The tractor 1 according to the present embodiment has Feature 5 below. Specifically, in the tractor 1, the cruise control operating tool 16 is operated to switch between a fixed state where the gear of the transmission 7 is fixed and a canceled state where the fixed state is canceled. The cancel pin 63 is provided to restrict the cruise control operating tool 16 from being operated to switch from the canceled state to the fixed state in a state where the brake pedal is operated.

This may prevent the cruise control device 40 from switching to the fixed state in a state where the brake is actuated.

The tractor 1 according to the present embodiment has Feature 6 below. Specifically, in the tractor 1, the cruise control device 40 includes the cancel mechanism 60 that switches from the fixed state to the canceled state. The cancel pin 63, which is a restriction member, also serves as the cancel mechanism 60.

This may reduce the number of parts.

Features 1 to 6 described above may be combined as appropriate as long as there are no contradictions. For example, Feature 3 may be combined with at least one of Features 1 and 2. Feature 4 may be combined with at least one of Features 1 to 3. Feature 5 may be combined with at least one of Features 1 to 4. Feature 6 may be combined with at least one of Features 1 to 5.

The preferred embodiment of the present invention is described above; however, the above-described configuration may be modified, for example, as follows.

According to the above embodiment, the left brake pedal 14 is coupled to the cancel mechanism 60 via the wire, and the right brake pedal is coupled to the cancel mechanism 60 via the shaft. Alternatively, the left brake pedal 14 may be coupled to the cancel mechanism 60 via the shaft, and the right brake pedal 15 may be coupled to the cancel mechanism 60 via the wire. Alternatively, both the right and left brake pedals may be coupled to the cancel mechanism 60 via wires, or both the right and left brake pedals may be coupled to the cancel mechanism 60 via shafts.

According to the above embodiment, the gaps L1 and L2 are formed, but at least one of the gaps may be eliminated.

The cruise control device 40 according to the above embodiment is mechanical, but may also be electric. Specifically, a configuration may be such that acceleration and deceleration are performed such that detected values of a vehicle speed sensor remains constant. In this case, a cancel mechanism may also be electrical. Specifically, a sensor may be provided to detect the operation of the left brake pedal 14 or the right brake pedal 15, and a control may be performed to stop cruise control in response to detection of the sensor.

The cruise control operating tool 16 and the parking brake operating tool 17 are lever-type, but may be push or pedal type.

The above embodiment describes an example where the present invention is applied to the tractor, but the present invention is also applicable to work vehicles other than tractors, e.g., agricultural work vehicles such as rice planters, and construction or civil engineering work vehicles such as hydraulic excavators.

REFERENCE SIGNS LIST

1 Tractor (work vehicle)
3 Front wheel (traveling unit)
4 Rear wheel (traveling unit)
7 Transmission
9 Brake device
14 Left brake pedal (brake pedal)
15 Right brake pedal (brake pedal)
16 Cruise control operating tool
26 Wire tube (wire)
27 First wire end portion (wire)
28 Second wire end portion (wire)
30 Base shaft (shaft)
32 Right brake shaft (shaft)
40 Cruise control device
51 Second brake shaft (shaft)
60 Cancel mechanism
63 Cancel pin (restriction member)
L1 Gap
L2 Gap

The invention claimed is:

1. A work vehicle comprising:
a pair of traveling units comprising a first traveling unit provided on a right side or a left side and a second traveling unit provided on the other of the right side or the left side;
a transmission configured to shift a gear for a vehicle speed;
a pair of brake pedals comprising a first brake pedal and a second brake pedal, wherein the first brake pedal is positioned relative to the second brake pedal in a right-left direction;
a brake device configured to individually actuate brakes for the first traveling unit and the second traveling unit based on operation of the first brake pedal or the second brake pedal;
a cruise control operating tool; and
a cruise control device configured to fix the gear of the transmission based on operation of the cruise control operating tool, cancel the fixed gear of the transmission based on operation of the second brake pedal independent of the first brake pedal, and cancel the fixed gear of the transmission based on operation of the first brake pedal independent of the second brake pedal.

2. The work vehicle according to claim 1, wherein:
the cruise control operating tool is configured to be operated to switch between a fixed state where the gear of the transmission is fixed and a canceled state where the fixed state is canceled,
the cruise control device includes a cancel mechanism configured to switch from the fixed state to the canceled state,
the first brake pedal sides is coupled to the cancel mechanism via a wire, and
the second brake pedal is coupled to the cancel mechanism via a shaft.

3. The work vehicle according to claim 2, wherein a gap is formed in at least one of a mechanism configured to transmit an operating force applied to the first brake pedal to the cancel mechanism and a mechanism configured to transmit an operating force applied to the second brake pedal to the cancel mechanism, and based on operation of the first brake pedal or the second brake pedal beyond the gap, the cancel mechanism is actuated.

4. The work vehicle according to claim 3, wherein:
the first brake pedal and the second brake pedal are configured to be coupled to each other,
the first brake pedal and the second brake pedal are different in an amount of operation needed to actuate the cancel mechanism, and
based on operation of the first brake pedal and the second brake pedal in a coupled state, an operating force is transmitted to the cancel mechanism via only the shaft or the wire.

5. The work vehicle according to claim 1, wherein:
the cruise control operating tool is configured to be operated to switch between a fixed state where the gear of the transmission is fixed and a canceled state where the fixed state is canceled, and
the work vehicle further includes a restriction member that is configured to, in a state where the brake pedal is operated, restrict the cruise control operating tool from being operated to switch from the canceled state to the fixed state.

6. The work vehicle according to claim 5, wherein:
the cruise control device includes a cancel mechanism that is configured to switch from the fixed state to the canceled state, and
the cancel mechanism includes the restriction member.

7. A work vehicle comprising:
a pair of traveling units comprising a first traveling unit provided on a right side or a left side and a second traveling unit provided on the other of the right side or the left side;
a transmission configured to shift a gear for a vehicle speed;
a pair of brake pedals comprising a first brake pedal and a second brake pedal, wherein the first brake pedal is positioned relative to the second brake pedal in a right-left direction;
a brake device configured to individually actuate brakes for the first traveling unit and the second traveling unit based on operation of the first brake pedal or the second brake pedal;
a cruise control operating tool; and
a cruise control device configured to fix the gear of the transmission based on operation of the cruise control operating tool, cancel the fixed gear of the transmission based on operation of the second brake pedal independent of the first brake pedal, and cancel the fixed gear of the transmission based on operation of the first brake pedal independent of the second brake pedal;
wherein the cruise control operating tool is configured to be operated to switch between a fixed state where the gear of the transmission is fixed and a canceled state where the fixed state is canceled;
wherein the cruise control device includes a cancel mechanism configured to switch from the fixed state to the canceled state;
wherein the first brake pedal is coupled to the cancel mechanism via a wire; and
wherein the second brake pedal is coupled to the cancel mechanism via a shaft.

8. The work vehicle according to claim 7, wherein a gap is formed in at least one of a mechanism configured to transmit an operating force applied to the first brake pedal to the cancel mechanism and a mechanism configured to transmit an operating force applied to the second brake pedal to the cancel mechanism, and based on operation of the first brake pedal or the second brake pedal beyond the gap, the cancel mechanism is actuated.

9. The work vehicle according to claim 8, wherein the first brake pedal and the second brake pedal are configured to be coupled to each other, the first brake pedal and the second brake pedal are different in an amount of operation needed to actuate the cancel mechanism, and based on operation of the first brake pedal and the second brake pedal in a coupled state, an operating force is transmitted to the cancel mechanism via only the shaft or the wire.

10. The work vehicle according to claim 7, wherein the cruise control operating tool is configured to be operated to switch between a fixed state where the gear of the transmission is fixed and a canceled state where the fixed state is canceled, and the work vehicle further includes a restriction member that is configured to, in a state where the brake pedal is operated, restrict the cruise control operating tool from being operated to switch from the canceled state to the fixed state.

11. The work vehicle according to claim 10, wherein the cruise control device includes a cancel mechanism that is configured to switch from the fixed state to the canceled state, and the cancel mechanism includes the restriction member.

\* \* \* \* \*